United States Patent [19]

Bannink, Jr.

[11] Patent Number: 4,867,822

[45] Date of Patent: Sep. 19, 1989

[54] METHOD FOR IN-PLACE FABRICATION OF GRAPHITE EPOXY BUSHINGS IN GRAPHITE EPOXY STRUCTURES

[75] Inventor: Engbert T. Bannink, Jr., King County, Wash.

[73] Assignee: The Boeing Corporation, Seattle, Wash.

[21] Appl. No.: 81,669

[22] Filed: Aug. 4, 1987

[51] Int. Cl.⁴ ............................................. B32B 31/16
[52] U.S. Cl. ................................. 156/153; 156/165; 156/191; 156/194; 156/294
[58] Field of Search ................. 156/94, 191, 194, 165, 156/267, 153, 293, 294, 362; 264/229, 231, 267–269

[56] References Cited

U.S. PATENT DOCUMENTS

| | | | |
|---|---|---|---|
| 2,794,481 | 6/1957 | Anderson | 156/194 |
| 3,193,424 | 7/1965 | Scott | 156/153 |
| 3,511,734 | 5/1970 | Darrow | 156/294 |
| 3,616,117 | 10/1971 | Anderson et al. | 156/94 |
| 3,788,926 | 1/1974 | Weisinger | 156/294 |
| 3,917,299 | 11/1975 | Anderson | 156/94 |
| 4,361,451 | 11/1982 | Renaud | 156/294 |
| 4,432,824 | 2/1984 | Cook et al. | 156/294 |
| 4,461,663 | 7/1984 | Tachibana et al. | 156/294 |
| 4,545,837 | 10/1985 | Wehnert | 156/191 |
| 4,588,626 | 5/1986 | Cologna et al. | 156/94 |

Primary Examiner—Merrell C. Cashion, Jr.
Attorney, Agent, or Firm—Seed and Berry

[57] ABSTRACT

A method of forming a bushing in a graphite/epoxy structure in order to repair holes that are either too large or out-of-round. A mandrel having a diameter that is smaller than the desired hole diameter is wrapped with a strip of epoxy-impregnated graphite mat until the mandrel and mat tightly fit into the hole in the graphite/epoxy structure. The mandrel is then heated causing the mandrel to both expand and cure the epoxy resin in the mat. Expansion of the mandrel forces the mat against the edge of the hole to promote bonding between the mat and the graphite/epoxy structure. After the mat has cured, the mandrel is cooled thereby causing it to contract away from the mat so that it can be easily removed. Finally, the mat is trimmed to the thickness of the graphite/epoxy structure and a hole having the desired diameter is then machined in the mat.

15 Claims, 2 Drawing Sheets

METHOD FOR IN-PLACE FABRICATION OF GRAPHITE EPOXY BUSHINGS IN GRAPHITE EPOXY STRUCTURES

GOVERNMENT RIGHTS

This invention was made with U.S. Government support and the U.S. Government therefore has certain rights in this invention.

DESCRIPTION

1. Technical Field

This invention relates to the repair of graphite/epoxy structures and, more particularly, to a method for decreasing the size of a hole in a graphite/epoxy structure to a desired hole size.

2. Background Art

During the machining of metal and composite structures, holes are occasionally cut by mistake that are too large or out-of-round. For example, in aircraft construction, holes are frequently cut through structural panels of bulkheads to allow penetration of fuel or hydraulic lines. A hole that is mistakenly cut too large or out-of-round in a metal structure is not too serious and techniques have been developed to remedy such mistakes. In a metal structure, a bushing made from a compatible metal can be easily and quickly press-fit to the oversized hole. A hole having the correct size is then formed in the bushing. However, in a composite structure, the accepted solution for metal structures cannot be used for several reasons. First, few metals are compatible with the graphite/epoxy commonly used to form composite structures. Two common metals that are compatible with graphite/epoxy are titanium and corrosion resistant stainless steel. However, bushings made from these materials are not readily available in the desired sizes and lengths, and both metals are difficult to finish with common hand tools. Second, high interference pressfits are not feasible in graphite/epoxy structures since the graphite/epoxy structure is not sufficiently sturdy to withstand the press-fit. Instead, a high interference press-fit can easily delaminate the graphite/epoxy structure. As a result, the bushing would not be retained in the hole and an additional repair would be subsequently required when the bushing was released from the hole.

Attempts have been made to fabricate graphite/epoxy bushings for use in graphite/epoxy structures. For example, U.S. Pat. No. 4,545,837 to Wehnert, et al. discloses a process for molding composite bushings in which a strip or string of pre-impregnated graphite cloth wrapped tightly upon itself forms a cylindrical plug. The plug is then inserted into a hole formed in the composite structure and cured. A hole of the desired diameter is then drilled in the plug. While the Wehnert, et al. method may be satisfactory under some circumstances, it has several shortcomings. First, the Wehnert, et al. method does not allow the plug to be both easily inserted into the hole and forced against the surrounding composite structure during the curing stage to ensure an adequate bond. Further, the use of a plug entirely fabricated from graphite epoxy makes the repair of oversize or out-of-round holes relatively expensive and it makes it somewhat difficult to heat the plug while curing, since the heat must be applied from outside the plug.

DISCLOSURE OF INVENTION

It is an object of the invention to provide a method of repairing oversize and out-of-round holes in graphite/epoxy structures.

It is another object of the invention to provide a method of forming a bushing in a graphite/epoxy structure in a manner that ensures good bonding between the bushing and the structure.

It is another object of the invention to provide a method of forming a bushing in a graphite/epoxy structure in a manner that facilitates the application of heat to the bushing during curing.

It is still another object of the invention to provide a method of forming a bushing in a graphite/epoxy structure that is relatively inexpensive and easy to perform and can be readily adapted to a wide variety of bushing sizes.

It is a further object of the invention to provide a method of forming a bushing in a graphite/epoxy structure that can be easily machined and finished with common hand tools.

These and other objects of the invention are provided by a method of fabricating a graphite/epoxy bushing within a hole formed in a graphite/epoxy structure. After the bushing is formed, a hole having a predetermined diameter can be machined in the bushing. The bushing is formed by providing a cylindrical mandrel having a diameter that is smaller than the diameter of the desired hole. The mandrel has a positive coefficient of thermal expansion so that it expands when it is heated. The mandrel is then wrapped with a strip of epoxy impregnated graphite mat until the diameter of the mandrel and mat is proximately equal to the diameter of the existing hole. The mat and mandrel are then inserted into the hole, and the mandrel is heated to a predetermined temperature. Heating the mandrel provides two functions. First, heating the mandrel causes it to expand thereby forcing the mat against the edge of the hole. Second, the heated mandrel cures the mat and securely binds it to the graphite/epoxy structure in which the hole is formed. After, the mat has cured, the mandrel is cooled, thereby causing the mandrel to contract away from the cured mat. The mandrel can then easily be removed from the cured mat in order to form the bushing. In the event that the height of the cylindrical mandrel and the width of the mat is greater than the thickness of the graphite/epoxy structure, the bushing can be trimmed flush with the graphite/epoxy structure after the mandrel has been removed from the mat. The mandrel may be formed from a variety of materials, including silicone rubber and aluminum. If an aluminum mandrel is used, it is preferably coated with a release agent prior to being wrapped with the strip of epoxy impregnated fiber mat. The mandrel may be heated utilizing a variety of techniques. It may contain its own internal heating element or it may be heated externally, in which case the mandrel conducts the heat from the external source to the mat. The hole in the graphite/epoxy structure is preferably sanded prior to inserting the mandrel and mat into the hole in order to improve the bonding between the mat and the graphite/epoxy structure. If the resin in the mat is not a good adhesive, a separate layer of adhesive is desired between the mat and the inside surface of the existing hole.

BEST MODE FOR CARRYING OUT THE INVENTION

Figure 1:
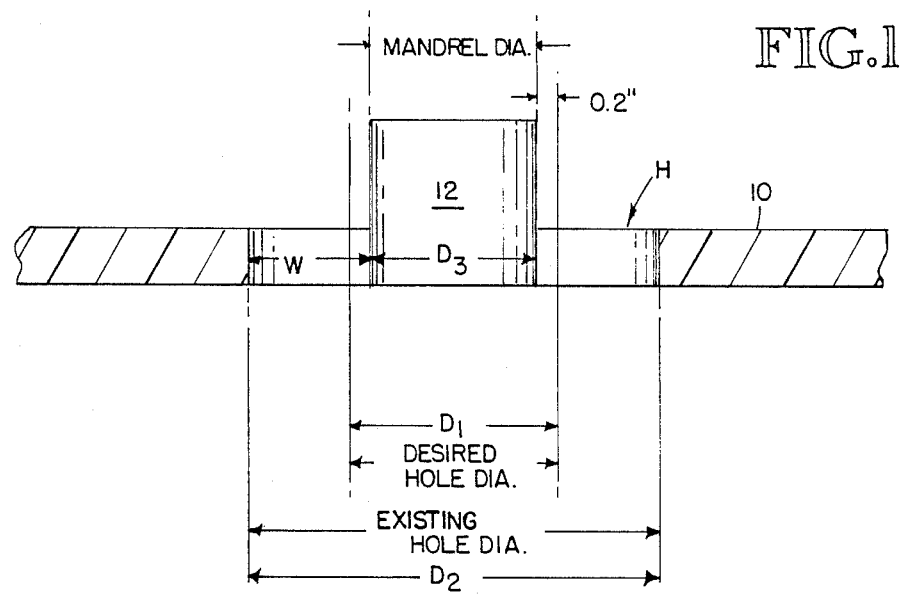
FIG. 1 is a schematic showing the dimensional relationships in the inventive method used to repair an oversize or out-of-round hole in a graphite/epoxy structure.

As illustrated in FIG. 1, the inventive method is used to repair a hole H formed in a graphite/epoxy structure 10. It is assumed that the hole H has been mistakenly made too large or out-of-round, and the correct sized hole is to be formed in the graphite/epoxy structure 10. The desired diameter of the hole $D_1$ is determined and a cylindrical mandrel 12 is then selected having a diameter that is slightly smaller than the desired hole diameter $D_1$, such as 0.2" smaller. The resulting bushing will then have an outside diameter equal to the existing hole diameter $D_2$, an inside diameter equal to the diameter of the mandrel $D_3$ and a width W equal to the difference between $D_2$ and $D_3$. While the mandrel 12 is illustrated in FIG. 1 as having a height that is larger than the thickness of the graphite/epoxy structure 10, it will be understood that the height of the mandrel 12 may be equal to the thickness of the graphite/epoxy structure 10. The mandrel 12 may be fabricated of a variety of materials as long as it has a positive coefficient of thermal expansion so that it expands when it is heated and contracts when it is cold. For example, silicone rubber or aluminum may be used to form the mandrel 12.

Figure 2:
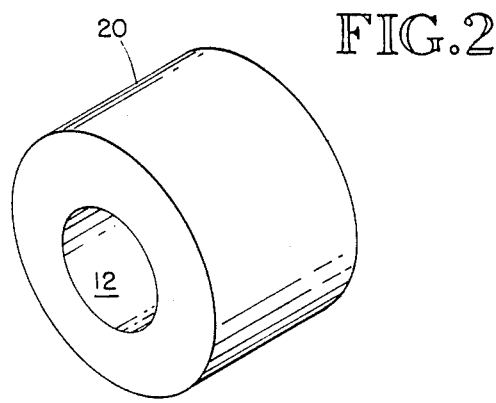
FIG. 2 is an isometric view showing the mandrel wrapped with a strip of epoxy impregnated graphite mat.
Figure 3:
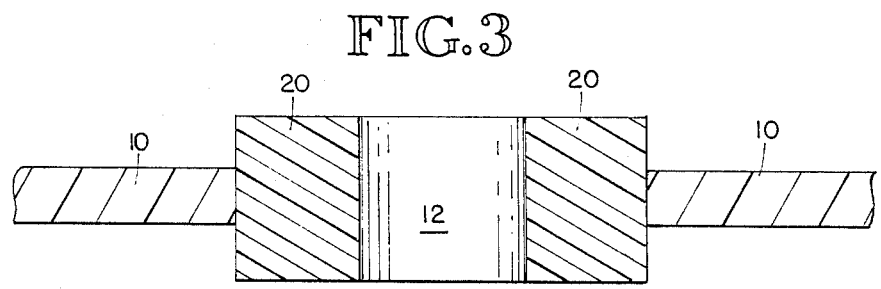
FIG. 3 is a cross-sectional view showing the mandrel and mat inserted into the hole in the graphite/epoxy structure.

With reference, now, to FIG. 2, a strip of conventional epoxy impregnated graphite mat 20 is wrapped around the mandrel 12 so that the mandrel 12 and mat 20 have a combined outside diameter that is approximately equal to the diameter $D_2$ of the existing hole in the graphite/epoxy structure. The fibers in the epoxy-impregnated graphite mat are preferably arranged in a random orientation, although other fiber orientations may be used. The diameter of the mandrel 12 and mat 20 should be as large as possible while still allowing the mandrel 12 and mat 20 to be inserted into the hole H as illustrated in FIG. 3. Thus, the diameter of the mandrel 12 and mat 20 will normally be slightly smaller than the diameter $D_2$ of the existing hole in the graphite/epoxy structure 10. However, if the mat 20 can be compressed, the diameter of the mandrel 12 and mat 20 may even be larger than the diameter $D_2$ prior to insertion in the hole H. In the event that the mandrel 12 is formed by a material, such as aluminum, that tends to stick to the mat, the mandrel should be coated with a release agent prior to being wrapped with the mat 20. The hole in the graphite/epoxy structure is preferably sanded prior to inserting the mandrel and mat into the hole in order to improve the bonding between the mat and the graphite/epoxy structure.

In the event that the epoxy resin in the mat 20 is not a good adhesive, after the mat 20 is wrapped around the mandrel 12 it should be coated with an adhesive that bonds well to cured graphite epoxy.

After the mandrel 12 and mat 20 have been inserted into the H in the graphite/epoxy structure 10, as illustrated in FIG. 3, the mandrel is heated. The mandrel may be heated using a conventional resistance or induction heating method in which the heat is generated externally from outside the mandrel 12. Where this heating technique is employed, the mandrel 12 conducts heat inwardly from its ends to the mat 20 surrounding the mandrel 12. The mandrel 12 may also be provided with a conventional internal heating element so that it conducts heat directly to the mat 20.

Regardless of which technique is used to heat the mandrel 12, heating the mandrel 12 performs two functions. First, since the mandrel 12 has a positive coefficient of thermal expansion, it expands when it is heated, thereby applying a radially outward force against the mat 20. The outward force exerted by the mandrel 12 against the mat 20 compresses the mat 20 between the mandrel 12 and the edge of the hole H formed in the graphite/epoxy structure. This compressive force ensures good bonding between the mat 20 and graphite/epoxy structure 10. Second, the heated mandrel 12 heats the mat 20, thereby curing the epoxy resin in the mat to bond the mat 20 to the graphite/epoxy structure 10. Although the cure times and temperatures will vary depending upon the specific epoxy resin used, a temperature range of between 250° F. and 350° F. will generally be used.

Figure 4:
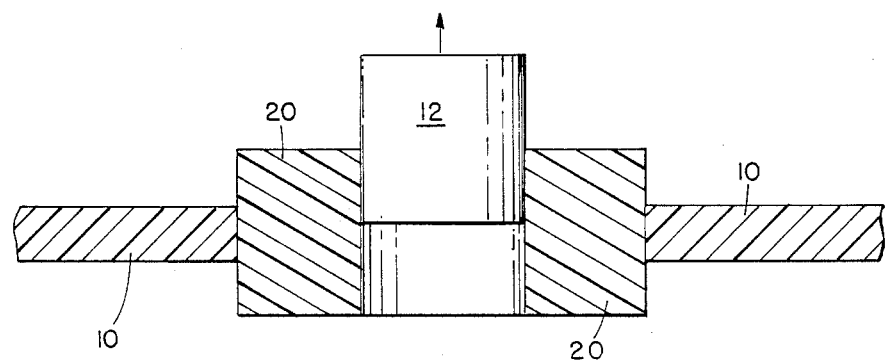
FIG. 4 is a cross-sectional view showing the mandrel being removed from the mat after the mandrel has cooled.
Figure 5:
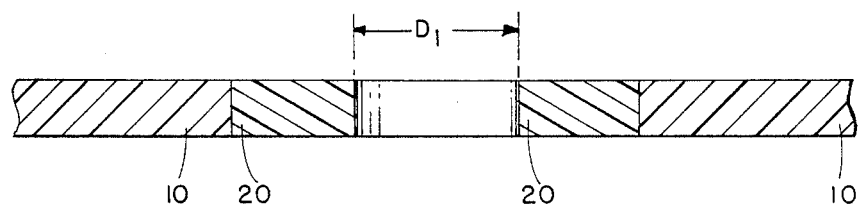
FIG. 5 is a cross-sectional view showing the completed bushing.

In order to stabilize the mat 20 while it is curing, a vacuum bag (not shown) may be placed on both sides of the mandrel 12. After the epoxy-impregnated graphite mat 20 had cured, the mandrel 12 is allowed to cool. When the mandrel 12 cools, it contracts, since the mandrel 12 has a positive coefficient of thermal expansion. When the mandrel contracts, it draws away from the cured mat 20 so that it can be easily removed, as illustrated in FIG. 4. The mat 20 thus forms a bushing, as illustrated in FIG. 4. If the height of the mandrel 12 and the width of the strips of epoxy-impregnated graphite mat 20 are larger than the thickness of the graphite/epoxy structure 10, the mat 20 will generally be trimmed to the thickness of the graphite/epoxy structure 10, as illustrated in FIG. 5. The trimming can be accomplished in a conventional manner using conventional power or hand tools. Finally, a hole having the desired hole diameter $D_1$ can be machined in the bushing formed by the mat 20 using conventional machining techniques, such as by reaming.

When the inventive graphite epoxy bushing is used to repair oversize or out-of-round holes, the bushing does not replace all of the strength that was lost when the hole was enlarged prior to inserting the bushing. The repair should thus normally be considered non-structural, and the surrounding structure should be capable of handling any loads without the bushing.

It is thus seen that the inventive method of fabricating a graphite/epoxy bushing quickly and easily allows repair of oversized and out-of-round holes in graphite/epoxy structures. Moreover, the method facilitates the application of heat to the bushing during curing and it allows bushings to be fabricated in a wide variety of sizes. Finally, the bushing can be easily machined and finished with common hand or power tools.

I claim:

1. A method of fabricating a graphite/epoxy bushing having a desired hole diameter within an existing hole formed in a graphite/epoxy structure, comprising:

providing a cylindrical mandrel having a positive coefficient of thermal expansion said mandrel having a diameter that is smaller than said desired hole diameter;

wrapping a strip of epoxy-impregnated graphite mat around said mandrel to provide an assembly having a diameter that is approximately equal to the diameter of said existing hole;

inserting said assembly into said existing hole;

heating the mandrel to expand said assembly, force said mat against the edge of said existing hole, and cure said mat;

cooling said mandrel after said mat has been cured, thereby causing said mandrel to contract away from said cured mat;

withdrawing said mandrel from inside said cured mat whereby said mat forms a bushing that is bonded to said graphite/epoxy structure; and machining a hole in said bushing having said desired hole diameter.

2. The method of claim 1 wherein the height of said cylindrical mandrel and the width of said mat are greater than the thickness of said graphite/epoxy structure, and wherein said method further includes the step of trimming said bushing to be flush with said graphite/epoxy structure after said mandrel is removed from said mat.

3. The method of claim 1 wherein said mandrel is fabricated of silicon rubber.

4. The method of claim 1 wherein said mandrel is fabricated of aluminum, and wherein said method further includes the step of coating said mandrel with a release agent prior to wrapping said strip of epoxy-impregnated mat around said mandrel.

5. The method of claim 1 wherein said mandrel is internally heated.

6. The method of claim 1 further including the step of sanding the edge of said existing hole prior to the step of inserting said mandrel and mat into said existing hole.

7. The method of claim 1, further including the step of coating said graphite mat-wrapped mandrel with an adhesive prior to insertion into said existing hole.

8. A method of repairing an existing hole in a graphite/epoxy structure that is either too large or out-of-round, said method comprising:

providing a cylindrical mandrel having a positive coefficient of thermal expansion, said mandrel having a diameter that is slightly smaller than a desired hole diameter to be formed in said graphite/epoxy structure;

wrapping a strip of epoxy-impregnated graphite mat around said mandrel to form an assembly having a diameter that is approximately equal to the diameter of said existing hole;

inserting said assembly into said existing hole;

heating said mandrel to expand said mandrel, force said mat against the edge of said existing hole, and cure said mat;

cooling said mandrel after said mat has been cured, thereby causing said mandrel to contract away from said cured mat;

withdrawing said mandrel from inside said cured mat whereby said mat forms a bushing that is bonded to said graphite/epoxy structure; and machining said desired hole diameter in said bushing.

9. The method of claim 8 wherein the diameter of said mandrel is about 0.2" smaller than said desired hole diameter.

10. The method of claim 8 wherein the height of said cylindrical mandrel and the width of said mat are greater than the thickness of said graphite/epoxy structure, and wherein said method further includes the step of trimming said bushing to be flush with said graphite/epoxy structure after said mandrel is removed from said mat.

11. The method of claim 9 wherein said mandrel is fabricated of silicon rubber.

12. The method of claim 9 wherein said mandrel is fabricated of aluminum, and wherein said method further includes the step of coating said mandrel with a release agent prior to wrapping said strip of epoxy-impregnated mat around said mandrel.

13. The method of claim 9 wherein said mandrel is internally heated.

14. The method of claim 8 further including the step of sanding the edge of said existing hole prior to the step of inserting said mandrel and mat into said existing hole.

15. The method of claim 8 further including the step of coating said mat-wrapped mandrel with an adhesive prior to inserting said mandrel and mat into said existing hole.

* * * * *

UNITED STATES PATENT AND TRADEMARK OFFICE
CERTIFICATE OF CORRECTION

PATENT NO. : 4,867,822

DATED : September 19, 1989

INVENTOR(S) : Engbert T. Bannink, Jr.

It is certified that error appears in the above-identified patent and that said Letters Patent is hereby corrected as shown below:

On the cover page, following "Assignee:", delete "The Boeing Corporation" and substitute therefor --The Boeing Company--.

In claims 11, 12 and 13, delete 9 and substitute therefor --8--.

Signed and Sealed this

Twenty-fifth Day of September, 1990

Attest:

HARRY F. MANBECK, JR.

*Attesting Officer*     *Commissioner of Patents and Trademarks*